(12) United States Patent
Nuss et al.

(10) Patent No.: US 7,483,432 B2
(45) Date of Patent: Jan. 27, 2009

(54) PACKET TRANSPORT ARRANGEMENT FOR THE TRANSMISSION OF MULTIPLEXED CHANNELIZED PACKET SIGNALS

(75) Inventors: Martin C. Nuss, Fair Haven, NJ (US); Ted K. Woodward, Holmdel, NJ (US)

(73) Assignee: Alcatel Lucent USA Inc., Murray Hill, NJ (US)

( * ) Notice: Subject to any disclaimer, the term of this patent is extended or adjusted under 35 U.S.C. 154(b) by 882 days.

(21) Appl. No.: 10/252,904

(22) Filed: Sep. 23, 2002

(65) Prior Publication Data

US 2004/0057469 A1  Mar. 25, 2004

(51) Int. Cl.
*H04L 12/56* (2006.01)
(52) U.S. Cl. .................... 370/395.3; 370/353; 370/471; 370/535
(58) Field of Classification Search ................. 370/352, 370/353, 366, 389, 392, 395.3, 395.52, 395.53, 370/400, 471, 535–538, 540
See application file for complete search history.

(56) References Cited

U.S. PATENT DOCUMENTS

| | | | | |
|---|---|---|---|---|
| 4,603,416 | A * | 7/1986 | Servel et al. ................. | 370/417 |
| 6,434,151 | B1 * | 8/2002 | Caves et al. ............... | 370/395.2 |
| 6,798,744 | B1 * | 9/2004 | Loewen et al. ............... | 370/235 |
| 6,999,461 | B2 * | 2/2006 | Li et al. ........................ | 370/400 |
| 7,023,851 | B2 * | 4/2006 | Chakravorty ................. | 370/392 |
| 7,043,541 | B1 * | 5/2006 | Bechtolsheim et al. ...... | 709/223 |
| 2001/0017723 | A1 * | 8/2001 | Chang et al. ................. | 359/128 |

FOREIGN PATENT DOCUMENTS

| | | | |
|---|---|---|---|
| EP | 993148 A2 | * | 4/2000 |
| WO | WO 0122679 A2 | * | 3/2001 |

OTHER PUBLICATIONS

Downey, T., "Overview of Tag Switching," Professional Program Proceedings Electronics Industries Forum of New England, 1997. May 1997. pp. 61-66.*
Rekhter, Y. et al., "Tag Switching Architecture Overview," Proceedings of the IEEE. Dec. 1997. vol. 85, iss. 12. pp. 1973-1983.*

* cited by examiner

*Primary Examiner*—Chi H Pham
*Assistant Examiner*—Donald L Mills

(57) ABSTRACT

A data packet transport arrangement includes a tag-based packet multiplexer and a tag-based packet demultiplexer, that utilizes an identification tag to identify packets to each of the N input channels so as to provide a logical transport channel for each of the N channels through the packet transport arrangement. The data transport arrangement thereby allows aggregating multiple communications channels into a higher bit rate link to increase bandwidth efficiency, without compromising the underlying channelized, guaranteed-bandwidth nature of the individual communication channels.

3 Claims, 7 Drawing Sheets

PACKET TRANSPORT ARRANGEMENT FOR THE TRANSMISSION OF MULTIPLEXED CHANNELIZED PACKET SIGNALS

TECHNICAL FIELD OF THE INVENTION

This invention relates to an arrangement for multiplexing/demultiplexing channelized packet signals, and more particularly, to a packet transport arrangement, including a tag-based packet multiplexer and a tag-based packet demultiplexer, that utilizes a channel identification tag to identify packets of each of the N input channels so as to provide a logical transport channel for each of the N channels through the packet transport arrangement.

BACKGROUND OF THE INVENTION

Wavelength-Division-Multiplexing (WDM) Transmission systems provide scalable capacity by adding additional wavelength channels as capacity demands grow. In addition, well-known multiple protocols like SONET, Fiber Channel, Gigabit Ethernet (GbE), and ESCON can be transmitted over the same fiber by putting each protocol on a separate wavelength. While this method provides flexibility, it does not efficiently use the bandwidth provided by the wavelength. For example, GbE only utilizes 1.25 Gb/s of a 2.5 Gb/s or 10 Gb/s WDM communications channel, and the ESCON even only utilizes 200 Mb/s, one-fiftieth of the bandwidth provided in a 10 Gb/s wavelength.

Three main approaches have emerged that allow aggregating multiple communications channels into a single wavelength to increase bandwidth efficiency, while providing fixed bandwidth guarantees for each of the channels:

- Mapping protocols into the SONET hierarchy and using SONET multiplexing to aggregate to the higher bit rate. For example, 100 Mb/s Fast Ethernet can be mapped into an 155 Mbps OC3 circuit, and 16 OC3's can be multiplexed into an 2.5 Gbps OC 48 SONET WDM link.
- The new and still evolving Digital Wrapper standard (ITU G.709) can be used for multiplexing almost arbitrary communication channels onto a higher-speed link
- Simple TDM (time-division-multiplexing) techniques can be used to aggregate multiple communications channels onto a single wavelength While the first two methods involve the use of complex SONET or SONET-like framing chips as well as a number of external chips and buffering to map Ethernet into the SONET or Digital Wrapper circuits, the latter method is an easy to implement and low cost solution. A problem with the latter method is that TDM interleaving of packet signals leads to a nonstandard format, making it difficult to interface with existing transport equipment.

There is a continuing need for a data transport arrangement that would allow aggregating multiple communications channels into a higher bit rate link to increase bandwidth efficiency, without compromising the underlying channelized, guaranteed-bandwidth nature of the individual communication channels.

SUMMARY OF THE INVENTION

To solve these outstanding needs, our data packet transport arrangement includes a tag-based packet multiplexer and a tag-based packet demultiplexer, that utilizes an identification tag to identify packets to each of the N input channels so as to provide a logical transport channel for each of the N channels through the packet transport arrangement.

More particularly, in accordance with the operating method and apparatus of the present invention, a packet transport arrangement comprises a packet multiplexer apparatus including a tag inserter for assigning an identification tag to each of N input packet signals received at an input port to identify a signal characteristic of that received packet, the identification tag being inserted into (1) non-information carrying bytes of the preamble of each packet signal or (2) an interpacket gap between adjacent packet signals. The packet multiplexer apparatus also includes a multiplexer for multiplexing the N tagged input packet signals, received at different N input ports of the packet multiplexer apparatus, into a multiplexed packet signal for transmission over a communication link. A packet demultiplexer apparatus receives the multiplexed packet signal and demultiplexes all packets using the identification tag to select which output of the demultiplexer to send each packet.

According to other aspects of our invention, the tag may identify signal characteristics such as a channel number or a protocol format of an input packet signal.

BRIEF DESCRIPTION OF THE DRAWINGS

In the drawings.

In the following description, identical element designations in different figures represent identical elements. Additionally in an element designation, the first digit refers to the figure in which that element is first located (e.g., 102 is first located in FIG. 1).

DETAILED DESCRIPTION

Figure 1:
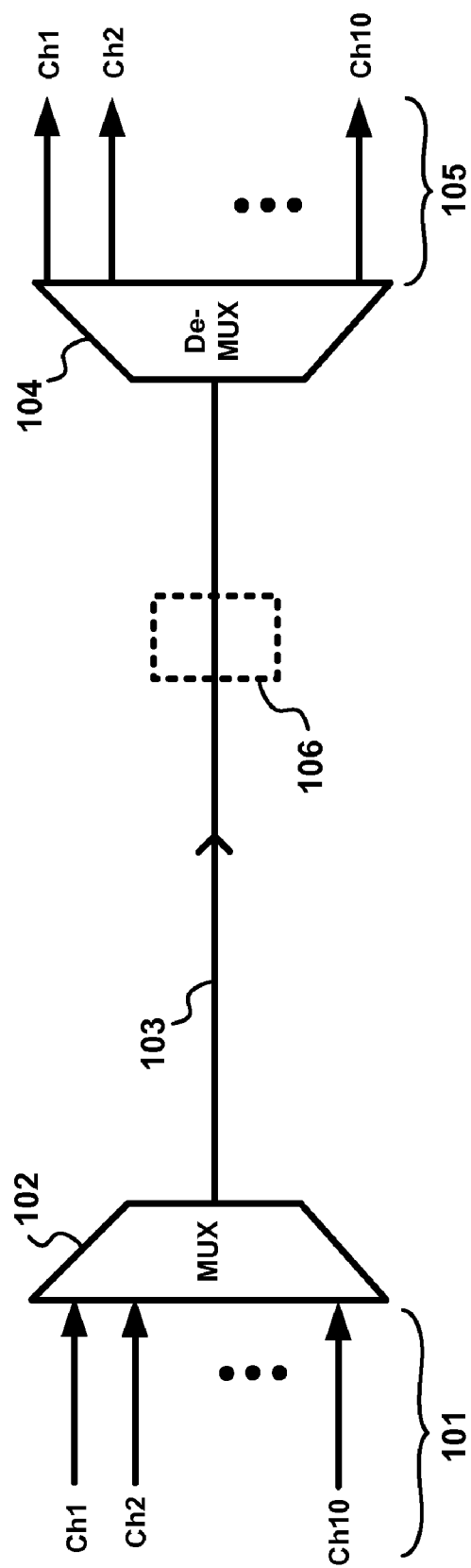
FIG. 1. shows a prior art multiplexer based communication system for multiplexing lower-data rate signal channels into a higher-data rate signal channel.

With reference to FIG. 1, there is shown a prior art multiplexer based communication system for multiplexing lower-data rate signal channels into a higher-data rate signal channel. Illustratively, in such communication systems, the input Ethernet or Gigabit Ethernet packet streams (or channels) 101 are multiplexed 102 onto a high-bit rate Metro or Long-Haul link 103 in a channelized, dedicated bandwidth way using SONET multiplexing. For example, 100 Mb/s Fast Ethernet packet streams can be mapped into an OC3 link, and 16 OC3 links can be multiplexed into an OC 48 SONET WDM link. Thus, each of the input signal channels 101 have a guaranteed bandwidth over link 103. Note, the communication link 103 may pass through one or more TDM switches (e.g., SONET/SDH cross connects, add-drop-multiplexer, or repeaters 106) on its way to demultiplexer 104. At the far end, demultiplexer 104 demultiplexes the high-bit rate signal received over link 103 into Ethernet or Gigabit Ethernet packet streams 105. While this technique provides each channel 101 with a guaranteed bandwidth, the SONET multiplexing approach adds a lot of complexity and overhead to the process of multiplexing, and also requires many auxiliary components to provide the mapping of Ethernet packets into the SONET circuits. A prior patent application, entitled "APPARATUS AND METHOD FOR REDUCING THE LINE RATE OF TIME-MULTIPLED SIGNALS," Ser. No. 09/862,573, Filed on May 21, 2001, describes a simple multiplexing technique that allows the mapping of multiple (e.g., eight) Gigabit Ethernet streams onto a single 10 Gb/s serial link without the complexity and additional circuitry required for SONET multiplexing.

Figure 2:
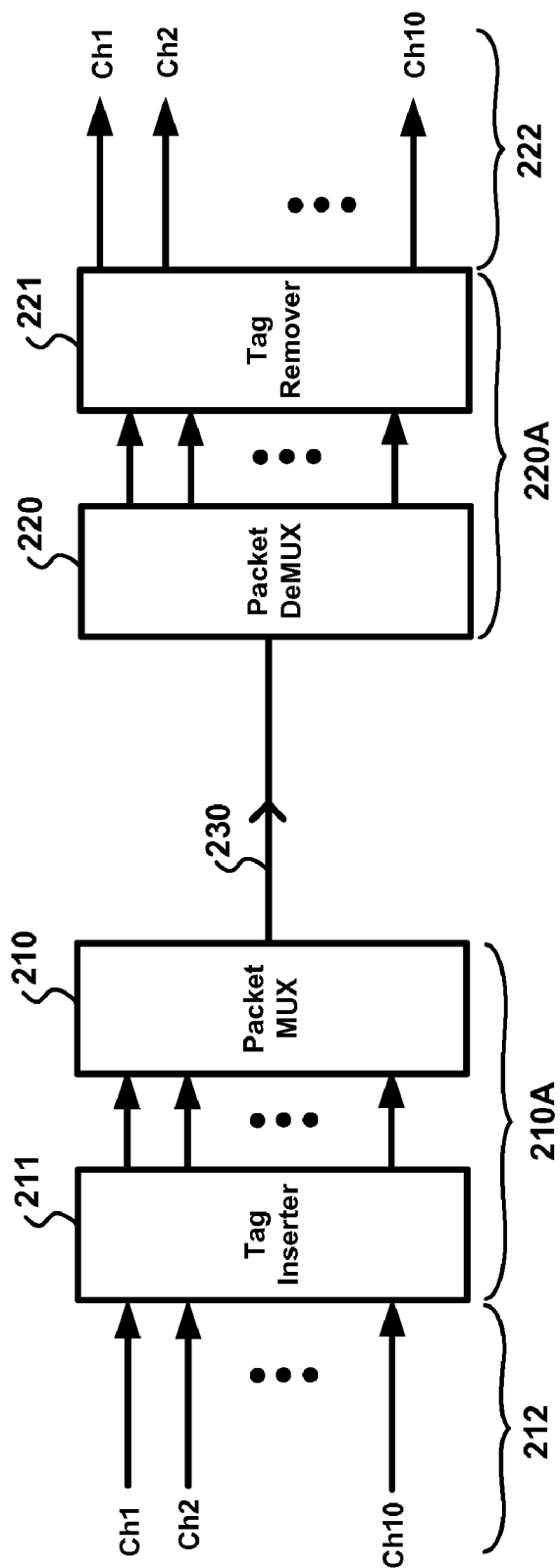
FIG. 2 shows our illustrative tag-based packet transport arrangement, including a tag-based packet multiplexer and a tag-based packet demultiplexer, for multiplexing lower-data rate signal channels into a higher-data rate signal channel for transmission over a communication link.

FIG. 2 shows a tag-based packet transport arrangement in accordance with the present invention. As shown, the packet transport arrangement includes a tag-based packet multiplexer apparatus 210A for multiplexing lower-data rate input transport link signal channels into a higher-data rate signal channel for transmission over a communication link 230 and a tag-based packet demultiplexer apparatus 220A for demultiplexing the higher-data rate signal channel back to the lower-data rate signal channels. The tag-based packet multiplexer apparatus 210A includes a multiplexer 210 and a tag (e.g., preamble) inserter unit 211. The tag-based packet demultiplexer apparatus 220A includes a demultiplexer 220 and a tag remover unit 221. At the packet multiplexer apparatus 210A, the tag inserter unit 211, inserts an identifier tag (e.g., as part of the preamble), onto the packet protocol used to transport each of the channel packets received at an input port 212 of multiplexer apparatus 210A. At the remote end, the demultiplexer apparatus 220A uses the tag to select the output port to which the channel packets are to be sent. A tag remover unit 221 of demultiplexer apparatus 220A, removes the tag and restores the packet communication protocol to its original format and outputs the channel packet to the designated output port of demultiplexer apparatus 220A. It should be noted that the tag may be used to identify any signal characteristic of the inputted packet signal, such as channel number, signal data rate, signal protocol, etc. In the following description for illustrative purposes, the tag will be considered as identifying a channel number of a received packet signal. It should also be noted that while the present invention will be described for use with Ethernet or Gigabit Ethernet packet streams, it can also be used with other packet based multiplexing protocols.

In this manner our packet transport arrangement of FIG. 2 can achieve channelized, guaranteed bandwidth multiplexing similar to conventional TDM multiplexing with a commercial packet switch, without the blocking, address learning, and statistical nature normally associated with packet switches. It should also be noted that the technique used in our invention can be transparent to the protocol used for the transmission of the input packet signals. Thus, for example, it is transparent to any Ethernet frame (VLAN, MPLS, etc.). Our preamble tag technique is different than other packet multiplexing approaches like port-based VLAN tagging and port-based MPLS tagging that are specific to a particular protocol or require using byte fields within the packet as a channel identifier, thus making it impossible for the customer data packets to use the same byte fields within their networks.

In one embodiment, the packet transport arrangement of FIG. 2 may include no more than 10 separate 1GbE channels 212, 222, which are multiplexed to and demultiplexed from high-speed fiber optic link 230 (10 GbE format or similar format). In such an arrangement, one or more packet switching chips with at least a single 10 GbE port and at least 10 separate 1 GbE ports can be used on both sides of the link 230. To avoid oversubscription of the link 230, no more than 10 separate GbE ports are loaded. This preserves the wire-like nature of link 230 and avoids the requirement for extensive packet buffering at multiplexer 210.

Figure 3:
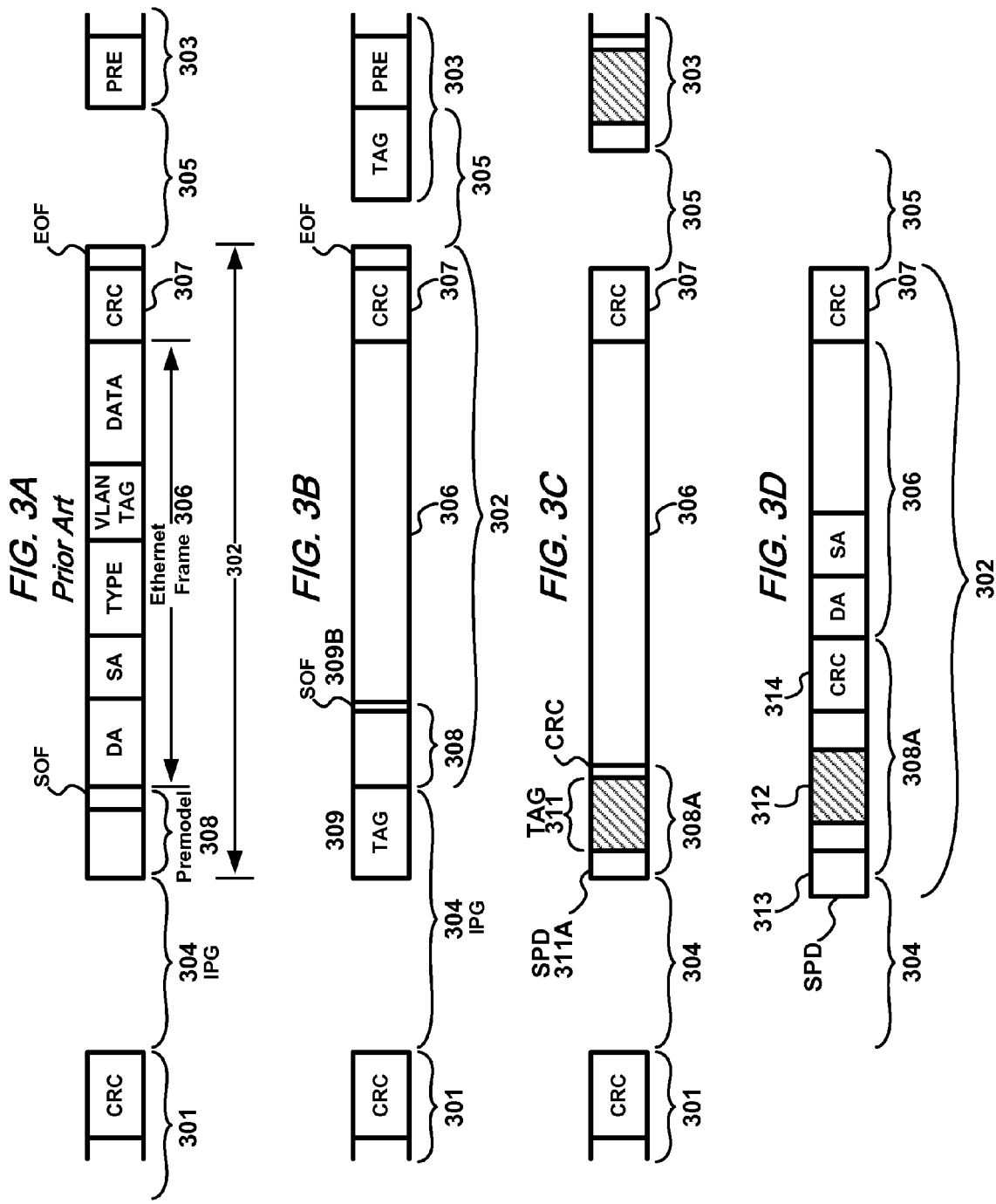
FIGS. 3A-3D show several illustrative packet data protocols for use in our illustrative tag-based packet transport arrangement.

The following discussion makes reference to FIGS. 2 and 3. Shown in FIG. 3A is an illustrative Ethernet packet data stream of several data packets 301-303 each separated by an interframe (or interpacket) gap (IPG), 304 and 305, respectively. The format of the standard Ethernet data packets 301-303 include a Preamble 308, an Ethernet data frame 306, an error detection code (CRC) field 307, and an End of Frame (EOF) character. The prior art preamble 308 includes 8-bytes with the Start of Frame (SOF) being the last byte of Preamble 308 prior to the Ethernet data frame 306. The Ethernet data frame 306 is shown to include a Destination address (DA), a Source address (SA), a data Type field, potentially a port based Local Area Network (VLAN) tag, and a data field. In the prior art, the various fields within the Ethernet data frame 306 were used for identifying data channels during multiplexing and demultiplexing operations. As discussed below, in contrast to these prior techniques the present invention uses non-information carrying bits or characters of the network communication link to identify the data channel. These bits or characters used to identify data channels may be placed in a portion of the interframe gap 304 or in the Preamble 308 field. Additionally, these bits may be used to identify a particular type of Ethernet protocol (VLAN, MPLS, etc.) that is being used in a data channel. Thus, using this approach, the present invention may be used for multiplexing multiple protocols (e.g., multiple Ethernet protocols) together into a common or $3^{rd}$ protocol.

The present invention makes use of the fact that (1) data packets have a minimum interframe gap (IPG) that needs to be maintained or (2) the Ethernet protocol includes a Physical Layer that has an 8-byte Preamble that contains a SOF byte, but does not contain any information carrying bits. Thus, both the interframe gap IPG 304 and Preamble 308 do not contain any information carrying bits and simply represent packet overhead. The present invention utilizes bytes in this unused Physical Layer overhead (in IPG 304 or Preamble 308) to provide a channel identification tag on a packet-by-packet basis. Consequently, the present invention does not reduce the available transmission bandwidth of the packet transport arrangement. Furthermore, since Ethernet line coding (8B10B for GbE, 4B5B for Fast Ethernet) provides delimiters for start and end-of-packet (e.g., Start of Frame—SOF and End of Frame—EOF), the channel identifier (or Tag) can alternatively be applied after line coding (e.g., in the interframe gap IPG 304 by replacing the regular IPG code groups) and packets can be switched to their destination ports based on a particular 8B10B or 4B5B code group. This is shown in FIG. 3B where the channel identifier (or Tag) 309 is shown inserted in and replacing part of the interpacket (interframe) gap (IPG 304) in front of the Preamble 308 of Ethernet packet 302. The Tag 309 is then associated with and processed by the present invention as part of the Ethernet packet 302.

Line code translation may in general still be required since the different speeds often use different line codes (e.g., 4B5B for FE, 8B10B for GbE, and 64/66B for 10-GbE), but identifying code groups and making packet switching decisions based on code group is generally an easy operation. As an alternative embodiment not requiring line code translation, shown in FIG. 3C, the channel identifier (Tag) may be coded in a byte field 311 within the modified preamble 308A after removing the line code. The modified preamble 308A is identified by a Start of Packet Delimiter (SPD 311A) and protected by a frame check sequence (CRC).

With reference to FIG. 3C, there is shown an illustration of a group of bytes forming modified Preamble 308A, including a code group (Tag 311) for channel identification. The Preamble includes a SPD byte 311A and includes an uncoded portion (6-bytes for a 1-Byte CRC) where a special channel identifier (Tag 311) would be placed. The SPD byte 311A is the first byte that is used to identify the start of modified Preamble 308A. It should be noted that Tag 311 can be placed anywhere within the 6-byte portion between SPD and CRC. Line code translation is automatic here as the Tag 311 is applied in the uncoded state.

Shown in FIG. 3D is a more detailed illustration of the format of modified Preamble 308A. Preamble 308A includes SPD 313, and a frame check sequence (CRC) 314, used for error detection. In the arrangements of FIGS. 3B-3D, the key fact is that the channel-identifying Tag is transmitted in either the interframe gap 304 (FIG. 3B) or in the Preamble 308 (FIGS. 3C and 3D) into non-information carrying bytes therein. The result is that channel tag information is sent using bytes of the transport link that are not normally used to carry channel tag information. Consequently, out channel-identifying Tag (whether encoded in a byte field within the preamble or the IPG) does not reduce the available communication bandwidth of our packet transport arrangement of FIG. 2 relative to prior art packet transport arrangements.

In the prior art, Ethernet packet multiplexing had only been accomplished within packet switches and routers where packet address look-up was required on a packet-by-packet basis. Packet identifiers such as destination addresses or VLAN tags (in particular in association with port-based VLANs) or MPLS labels were used in the prior art to provide packet multiplexing, with only port-based VLANs being able to provide a channelized operation. The shortcomings of the prior art are primarily that the labels used for channel or destination port identification were part of the packet, so that use of destination addresses or port-based VLAN tags within a channelized link resulted in interference with network assignment and use of the tags. For example, if port-based VLANs are used for channel identification, VLANs cannot be used anywhere else in the network. In contrast, the technique of the present invention uses a field (tag 309 of FIG. 3B) within the interframe gap 304 (which is processed as part of the subsequent packet 302) or a field (tag 311 of FIG. 3D) in an uncoded portion of Preamble 308A as a channel identifier. As a result, in our packet transport arrangement of FIG. 2, the packet multiplexing and demultiplexing scheme becomes completely independent of the Ethernet frame 306 format and tagging, and the so channelized packet multiplexer 210 will pass any valid Ethernet frame. Furthermore, since the interframe gap 304 is commonly stripped before being passed to the MAC layer (Layer-2) in Ethernet switches and adapters (231), no special provisions need to be made to strip the tag before going into a switch, at least in the case of the preamble (a minimum interframe gap often has to be maintained before entering a switch). Also in prior art packet switches and routers, the associated software for routing tables or address look-up, in addition to significant packet buffering to avoid packet loss when multiple packets are going to the same port are prohibitive and are made unnecessary in our packet transport arrangement. Packet buffering beyond the buffering required to hold a single packet is unnecessary in our packet transport arrangement since we select all input signal channels 212 to deterministically being routed to a single communication link 230, and that communication link 230 is selected to have a data rate at least equal to the sum of the data rates of the N input packet signal channels, 212. If each of the N channels has the same data rate then the communication link 230 is selected to have a data rate of N times that channel data rate.

With continued reference to FIGS. 2 and 3, for each received packet the channel tag inserter unit 211 adds a channel identification Tag in the interframe gap 304 or in the Preamble 308 of each transmitted packet to identify which of the N input ports (or channels) that packet was received. The placement of a channel identifier Tag in front of the channel packet (prepended Tag) does not result in a modified packet protocol, and remains compatible with the Ethernet link layer protocol. Thus, packets with prepended channel Tags pass through the multiplexer 210 which aggregates the packets of channels, 212, into a combined higher-data rate signal channel for transmission over link 230. The channel Tag in each packet enable the packet demultiplexer 220 to demultiplex all packets having the same channel Tag for output to the same output port of demultiplexer 220. Advantageously, the tag remover unit 221 then removes the channel Tag and restores the original format of the input packet signal channels 212. As mentioned above, the channel tag removal step may not be required in all instances, and the channel Tag could be supplied directly to appropriate $3^{rd}$ party standards-compliant equipment, so that that equipment knows to ignore the Tag.

Shown in FIGS. 4 through 7 are implementations of both our interpacket gap (IPG) (or interframe gap) and preamble based packet transport arrangements. These figures provide two different implementations of the tag-based packet multiplexer apparatus 210A (channel tag inserter unit 211 and packet multiplexer 210) and the tag-based packet demultiplexer 220A (channel tag remover unit 221 and packet demultiplexer 221) shown in FIG. 2.

Figure 4:
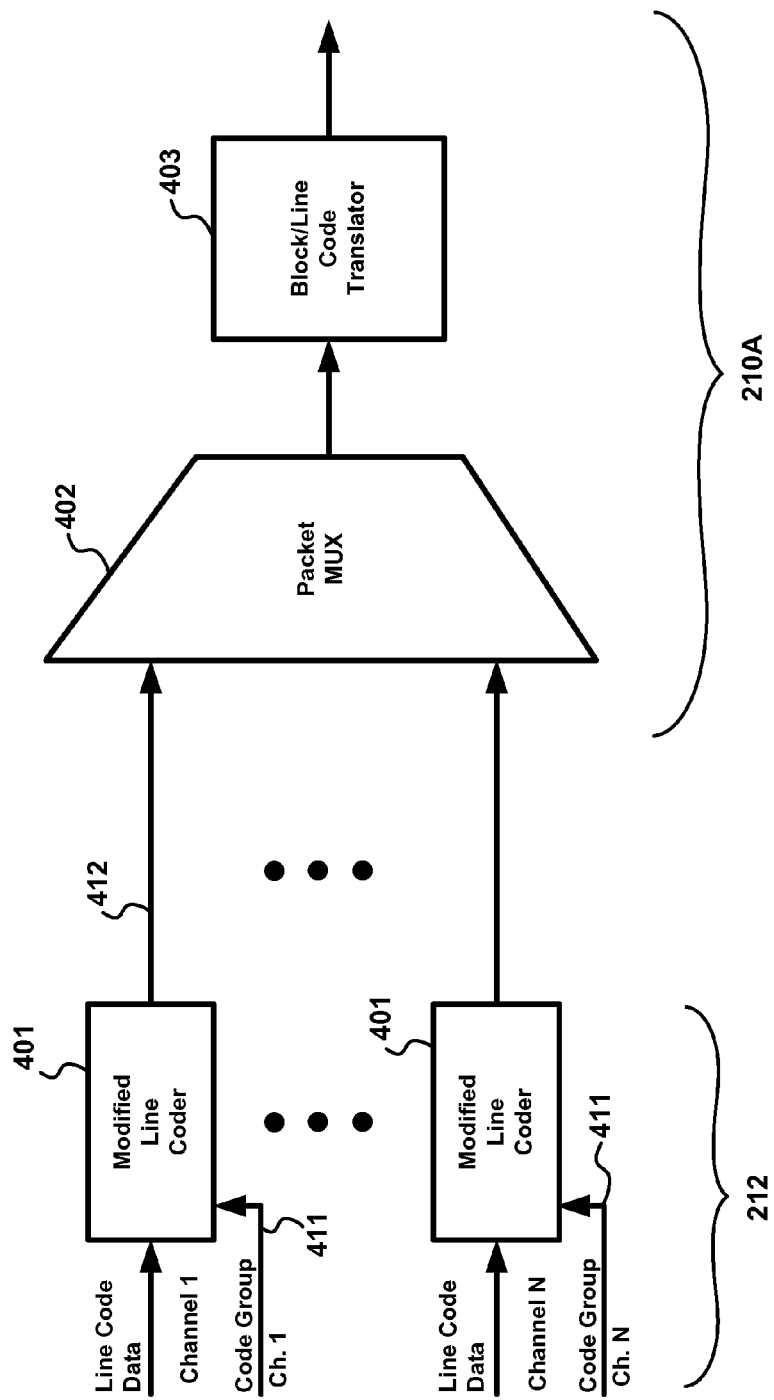
FIG. 4 shows an illustrative block diagram of an interpacket gap (IPG) based packet multiplexer apparatus.

The following description jointly references FIGS. 2, 3, and 4. FIG. 4 shows an illustrative block diagram of an IPG line code-based packet multiplexer apparatus (210A of FIG. 2) including modified Line Coders 401 (one for each channel), a Packet multiplexer 402 and an optional Block/Line Code Translator 403. As shown, uncoded data for an illustrative channels 1-N (e.g., channels CH1-CH 10, GbE type signals of FIG. 2) are received from data sources (not shown) and processed by modified Line Coder 401. The code group or channel Tag is also received 411 by Line coder 401 from each data source. The code group Tag may identify other characteristics, such as the protocol format, of the received packets. The channel Tag identifies the data channel of the data source. The modified Line coder 401 is a modified version of a prior art Line Coder. Prior art Line Coders add a Start of Frame (SOF) and End of Frame (EOF) code group around a data packet 302 in the process of line coding. This is shown in FIG. 3A, where SOF denotes the start and EOF the end of an Ethernet Frame or data packet 302. In comparison as shown in FIG. 3B, our modified Line Coder inserts a Tag 309 prior to (prepended) to Preamble 308. The channel Tag 309 is a unique code group, received or derived 411 from each data source, which identifies the channel number of the data packet 302. The outputs 412 of the Line Coders 401 are multiplexed by Packet Multiplexer 402. The multiplexed output is optionally connected to a Block/Line Code Translator 403 that is needed when input channels and multiplexed channel use different line codes. Different line codes may represent the different protocol formats used by different input channels. While Block/Line Code Translator 403 is shown in its preferred location after Packet Multiplexer 402, it can be located in front of the Packet Multiplexer 402. The output of Block/Line Code Translator 403 is connected to communication link 230.

Figure 5:
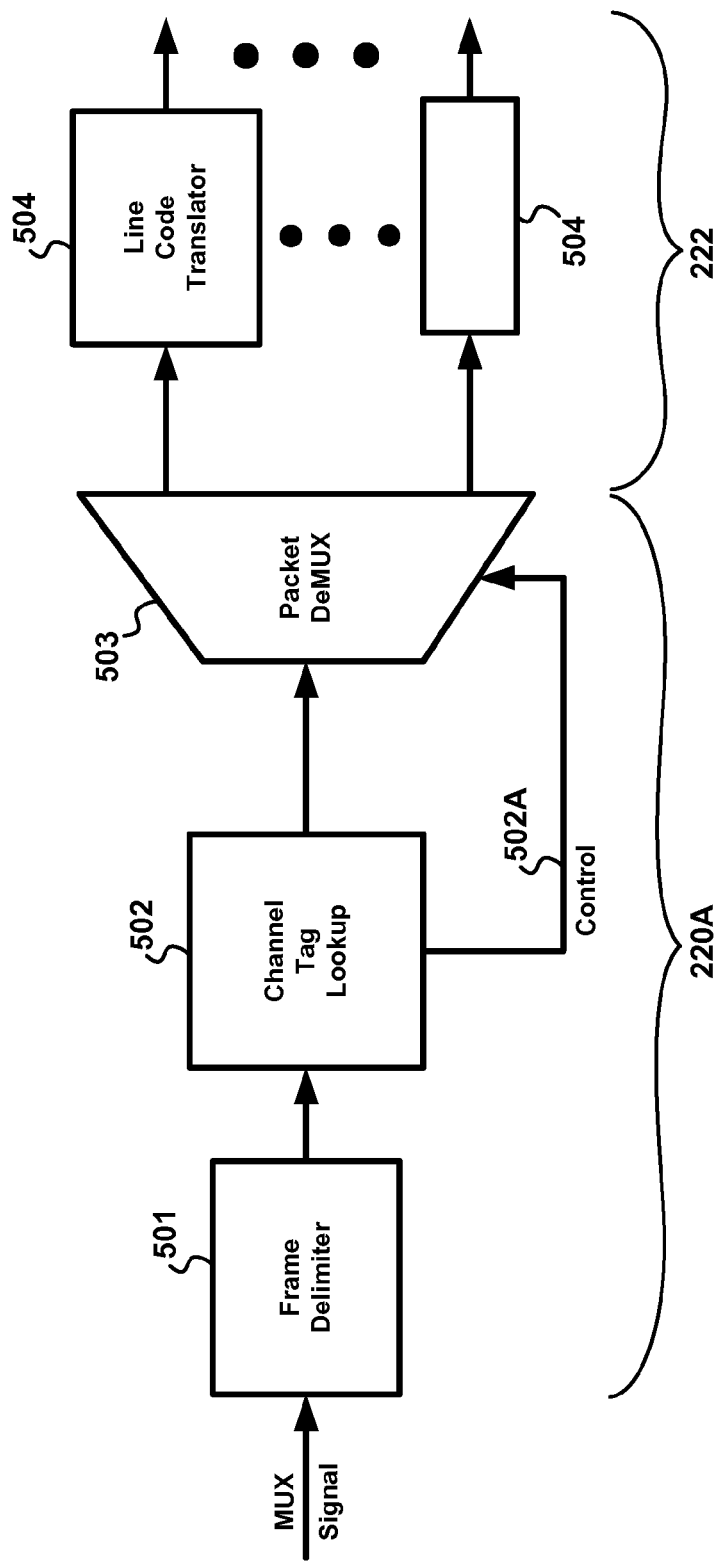
FIG. 5 shows an illustrative block diagram of an IPG based packet demultiplexer apparatus.

FIG. 5 shows an illustrative block diagram of an IPG line code based packet demultiplexer apparatus 220A including a Frame Delimiter 501, a Channel Tag Lookup 502, a Packet Demultiplexer 503, and optional Line Code Translators 504 for each channel. Frame Delimiter 501 receives the multiplexed packet signal over communication link 230 and locates the SOF 309B and End of Frame (EOF). The output of Frame Delimiter 501 is processed by Channel Tag Lookup 502, which recovers the Tag 309 and sends the tag information over control lead 502A to Packet Demultiplexer 503. Packet Demultiplexer 503 demultiplexes packets based on the channel Tag number (and by knowing where the packets end) and removes the Tag 309. The optional Line Code Translators 504, one for each channel, converts the line code to a different code in case the demultiplexed signal uses a different line code.

Figure 6:
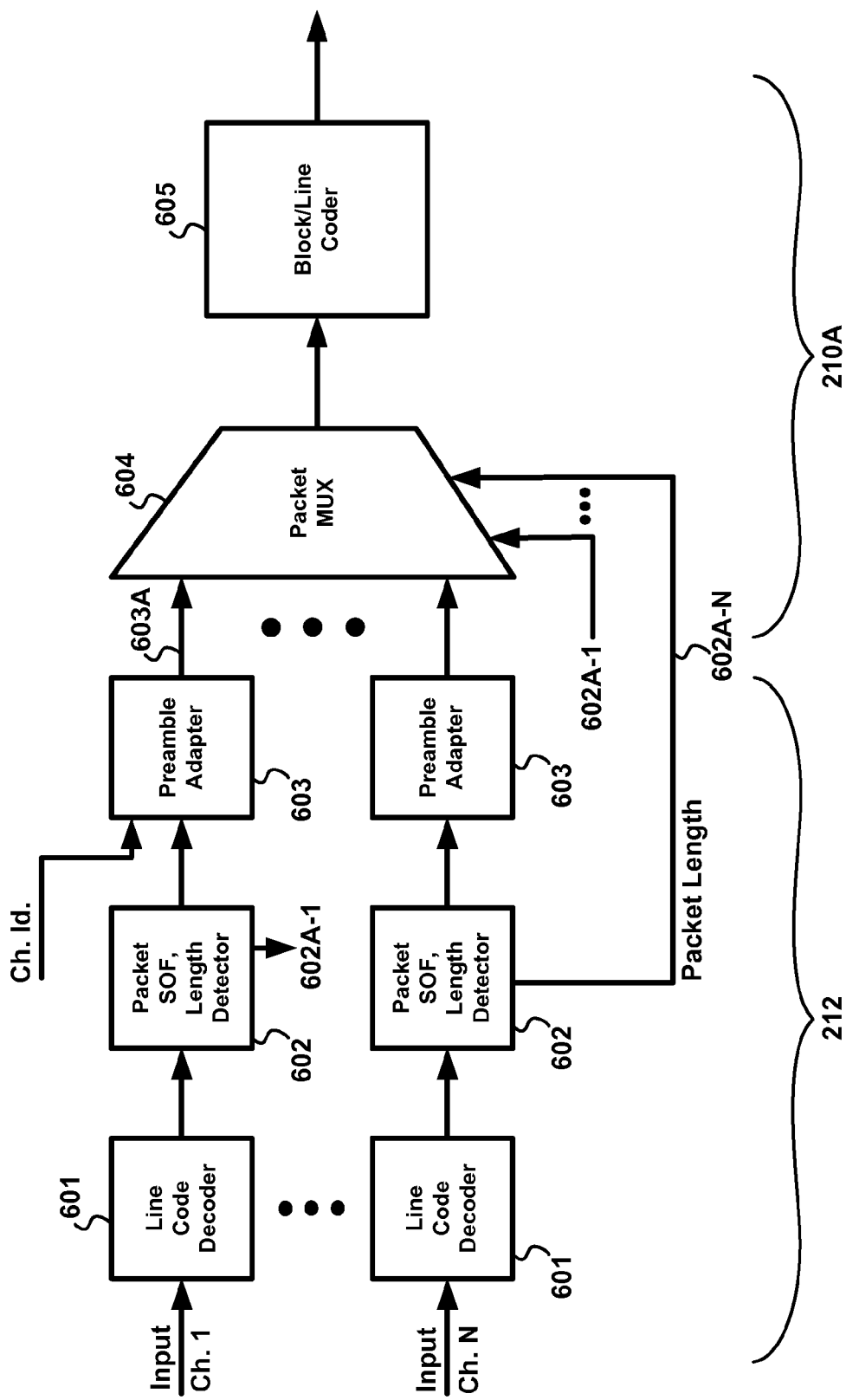
FIG. 6 shows an illustrative block diagram of a preamble based packet multiplexer apparatus.

FIG. 6 shows an illustrative block diagram of a preamble based packet multiplexer apparatus (210A of FIG. 2) including, for each channel, Line Decoders 601, Packet Detector (or Packet Delimiter) 602, Preamble adapter 603, a Packet multiplexer 604 and a Block/Line Coder 605. As shown, uncoded data for illustrative channels 1-N (e.g., channels CH1-CH 10, GbE type signals of FIG. 2) are received from data sources (not shown) and processed by Line Decoders 601. With reference to FIG. 6, each Line Decoder 601 receives or derives the code group or channel identifier Tag from each data source. As an example, the code group may also identify the protocol format of the received packets or data rate. Packet Detector 602 receives the data packets Line Decoder 601 and locates the SOF and end of data packet identifier EOF (following CRC 307). The end of packet identifier is sent over lead 602 to Packet Multiplexer 604. The output of Packet Detector 602 is sent to Preamble adapter 603, which converts the standard Preamble (308 of FIG. 3A) to our modified Preamble (308A of FIG. 3D). In comparison to the standard Preamble 308 of FIG. 3A, our Preamble adapter 603 modifies the standard Preamble 308, as shown by modified Preamble 308A in FIG. 3D, to now include a Start of Packet Delimiter (SPD 313), a channel Tag 312 located in the uncoded segment 315, and a CRC 314. The channel Tag 312 (e.g., channel number) is a special bit sequence 601, received or derived from the port number or from the data source, which identifies the channel number of the data packet 302. As noted previously, the channel Tag 312 may be located anywhere in Preamble 308A of FIG. 3D. The outputs 603A of each of the Preamble adapter 603 are multiplexed by packet multiplexer 604, with the provision that the multiplexer passes the preamble transparently. The end of packet identifier on leads 602A-1 through 602-N indicates to Packet Multiplexer 604 the end of packet for each input channel 1-N. The multiplexed output is connected to a Block/Line Coder 605.

Figure 7:
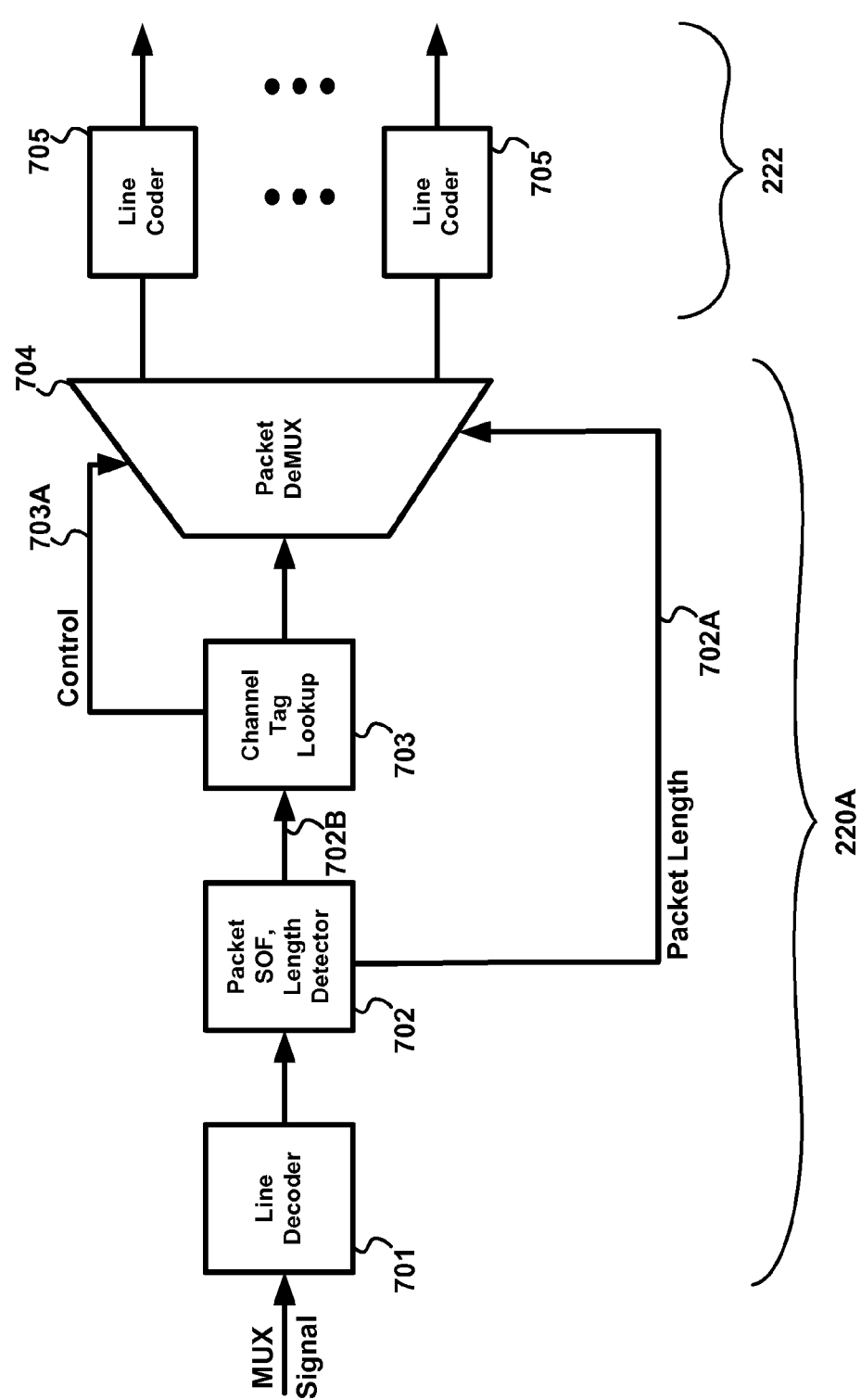
FIG. 7 shows an illustrative block diagram of a preamble based packet demultiplexer apparatus.

FIG. 7 shows an illustrative block diagram of a packet demultiplexer apparatus 220A including a Line Decoder 701, Frame Detector (or Delimiter) 702, a Channel Tag Lookup 703, a Packet Demultiplexer 704, and optional Line Coder 705 for each channel. Line Decoder 701 receives the multiplexed packet signal over communication link 230 and converts the data stream from the line coded format to standard Byte format. Frame Detector 702 locates the SOF 309B and End of Frame EOF (after CRC 307). Frame Detector 701 outputs a packet length signal 702A to Packet Demultiplexer 704. The output 702B of Frame Delimiter 701 is processed by Channel Tag Lookup 502, which recovers the Tag 309 (after checking CRC code 314, and restores the normal preamble) and sends the channel Tag number over control lead 703A to Packet Demultiplexer 704. Channel Tag Lookup 502 also replaces the modified Preamble 308A of FIG. 3D with the standard Preamble 306 of FIG. 3A. Packet Demultiplexer 703 demultiplexes packets based on channel Tag number (and knowing where the packets end). The Line Coder 705, one for each channel, outputs the channel data packet (with the standard Preamble) to its destination port.

The implementation of the various elements of both the IPG line-code based apparatus (FIGS. 4 and 5) and preamble based apparatus (FIGS. 6 and 7), may be implemented using well known circuit design technologies (e.g., using well-known Field Programmable Gate Array (FPGA), integrated circuits, processors, etc.).

We claim:

1. A method of operating a packet transport arrangement comprising the steps of:
    assigning an identification tag to each input channel packet signal received at a plurality of input ports of a packet multiplexer, wherein the identification tag assigned to each input channel packet signal identifies a channel number for each received channel packet signal,
    inserting the identification tag into (1) non-information carrying bytes of each received channel packet signal or (2) bytes located in an interpacket gap between adjacent packets of each received channel packet signal,
    multiplexing N tagged input channel packet signals into a multiplexed packet signal for transport over a communication link having a data rate at least equal to the sum of the data rates of the N tagged input channel packet signals,
    demultiplexing the multiplexed packet signal received over the communication link into N tagged input channel packet signals, and using the channel number to select a corresponding destination output port of a packet demultiplexer, for each tagged input channel packet signal,
    such that the N tagged input channel packet signals are multiplexed and demultiplexed according to the assigned channel numbers, in a channelized fashion irrespective of transmission protocol and routing information while having guaranteed bandwidth over the communication link.

2. The method of claim 1, wherein the assigning step is performed in a manner transparent to protocols used for the transmission of the input channel packet signals.

3. The method of claim 1, wherein the demultiplexing step further includes the step of removing the identification tags from the tagged input channel packet signals.

* * * * *